(12) United States Patent
Lovchik et al.

(10) Patent No.: US 12,128,408 B2
(45) Date of Patent: Oct. 29, 2024

(54) STRUCTURES ON MICROFLUIDIC DEVICES TO CONTROL SEDIMENTATION

(71) Applicant: Bio-Rad Laboratories, Inc., Hercules, CA (US)

(72) Inventors: Robert Dean Lovchik, Schoenenberg (CH); Iago Pereiro Pereiro, Zurich (CH); Govind Kaigala, Rueschlikon (CH); Anna Fomitcheva Khartchenko, Zurich (CH)

(73) Assignee: Bio-Rad Laboratories Inc., Hercules, CA (US)

( * ) Notice: Subject to any disclaimer, the term of this patent is extended or adjusted under 35 U.S.C. 154(b) by 45 days.

(21) Appl. No.: 16/532,798

(22) Filed: Aug. 6, 2019

(65) Prior Publication Data

US 2021/0039100 A1 Feb. 11, 2021

(51) Int. Cl.
*B01L 3/00* (2006.01)
*B01D 21/28* (2006.01)
(Continued)

(52) U.S. Cl.
CPC ...... *B01L 3/502761* (2013.01); *B01D 21/283* (2013.01); *B03C 1/288* (2013.01);
(Continued)

(58) Field of Classification Search
CPC ......... B01L 3/502761; B01L 2400/043; B01L 2200/0647; B01L 2300/0877;
(Continued)

(56) References Cited

U.S. PATENT DOCUMENTS 9,611,528 B2 4/2017 Duerig et al.
9,625,454 B2 4/2017 Strey et al.
(Continued)

FOREIGN PATENT DOCUMENTS

CN 102925337 A 2/2013
CN 105813752 A 7/2016
(Continued)

OTHER PUBLICATIONS

Lovchik et al., "Structures to Define Flow Confinement Shape and Confinement Stability With Uniform Aspiration", U.S. Appl. No. 16/532,766, filed Aug. 6, 2019.
(Continued)

*Primary Examiner* — Paul S Hyun
*Assistant Examiner* — Jean C. Caraballo-Leon
(74) *Attorney, Agent, or Firm* — Kilpatrick Townsend & Stockton LLP

(57) ABSTRACT

A microfluidic device may be provided. The microfluidic device comprises a processing surface having an aperture. The microfluidic device comprises a liquid ejection channel. The liquid ejection channel guides to the aperture. The microfluidic device comprises a first liquid injection channel guiding to the liquid ejection channel. The first liquid injection channel has a first end and a second end and is arranged to provide a fluid flow from the first end to the second end. At least a portion of the first liquid injection channel is closer to the processing surface than (both) the first and second ends to sediment particles.

17 Claims, 13 Drawing Sheets

(51) Int. Cl.
*B03C 1/28* (2006.01)
*B03C 1/30* (2006.01)
*B03C 5/00* (2006.01)
*G01N 27/447* (2006.01)

(52) U.S. Cl.
CPC ............... *B03C 1/30* (2013.01); *B03C 5/005* (2013.01); *G01N 27/44791* (2013.01); *B01L 2200/0647* (2013.01); *B01L 2300/0877* (2013.01); *B01L 2300/12* (2013.01); *B01L 2300/123* (2013.01); *B01L 2400/0424* (2013.01); *B01L 2400/043* (2013.01); *B03C 2201/18* (2013.01); *B03C 2201/20* (2013.01)

(58) Field of Classification Search
CPC .......... B01L 2300/123; B01L 2300/12; B01L 2400/0424; B01L 3/0268; B01L 2200/027; B01L 2400/0457; B01L 2400/0436; G01N 27/44791; B03C 5/005; B03C 1/30; B03C 1/288; B03C 2201/20; B03C 2201/18; B03C 5/026; B03C 2201/26; B01D 21/283; B01D 21/0009; B01D 21/0066; B01D 21/0087
See application file for complete search history.

(56) References Cited

U.S. PATENT DOCUMENTS

| | | |
|---|---|---|
| 2003/0108452 A1 | 6/2003 | Fuhr et al. |
| 2004/0072278 A1* | 4/2004 | Chou ............... G01N 15/1456 435/29 |
| 2006/0154233 A1 | 7/2006 | Deutsch |
| 2008/0067068 A1 | 3/2008 | Li |
| 2008/0128331 A1* | 6/2008 | Lean ........................ B04C 1/00 209/155 |
| 2008/0135502 A1 | 6/2008 | Pyo et al. |
| 2009/0236269 A1 | 9/2009 | Kojima |
| 2011/0259834 A1* | 10/2011 | Lee ................... B01L 3/502753 210/749 |
| 2013/0333761 A1 | 12/2013 | Delamarche et al. |
| 2014/0093867 A1 | 4/2014 | Burke et al. |
| 2015/0165347 A1* | 6/2015 | Nichols .............. B01D 21/0006 435/261 |
| 2015/0209783 A1 | 7/2015 | Ingber et al. |
| 2017/0059590 A1 | 3/2017 | McPeak et al. |
| 2017/0121663 A1 | 5/2017 | Hinojosa et al. |
| 2017/0370818 A1* | 12/2017 | Gazzola ................. G01N 15/10 |
| 2018/0001231 A1 | 1/2018 | Puleo et al. |
| 2018/0117588 A1 | 5/2018 | Ingber et al. |
| 2018/0200677 A1 | 7/2018 | Lee et al. |
| 2018/0246103 A1* | 8/2018 | Lipkens ............. G01N 15/1404 |
| 2018/0318831 A1 | 11/2018 | Kaigala et al. |
| 2019/0018034 A1 | 1/2019 | Kaigala et al. |

FOREIGN PATENT DOCUMENTS

| | | | |
|---|---|---|---|
| CN | 107110761 A | 8/2017 | |
| CN | 112292206 A | 1/2021 | |
| DE | 102013207232 A1 | 10/2014 | |
| EP | 3162441 A1 | 5/2017 | |
| JP | 4673149 B2 | 4/2011 | |
| KR | 20110124076 A | 11/2011 | |
| WO | WO-2013130910 A1 * | 9/2013 | ............... B01L 7/52 |
| WO | 2015132686 A1 | 9/2015 | |
| WO | 2019150189 A1 | 8/2019 | |

OTHER PUBLICATIONS

Kaigala et al., "Prevention and Bubble Removal From Microfluidic Devices", U.S. Appl. No. 16/532,825, filed Aug. 6, 2019.
List of IBM Patents or Patent Applications Treated as Related, Dated Aug. 6, 2019, 2 pages.
Rousset et al., "Simulation-assisted design of microfluidic sample traps for optimal trapping and culture of non adherent single cells, tissues, and spheroids", Scientific Reports, Published Online: Mar. 21, 2017, DOI:10.1038/s41598-017-00229-1, 12 pages.
International Search Report and Written Opinion of the International Searching Authority mailed Nov. 17, 2020 in International Patent Application No. PCT/US2020/045117. 10 pages.
International Preliminary Report on Patentability mailed Feb. 17, 2022 in International Patent Application No. PCT/US2020/045117. 7 pages.
English translation of Office Action mailed Feb. 16, 2023 in CN Patent Application No. 202080069953.7. 16 pages.
Extended European Search Report dated Oct. 9, 2023 in EP Patent Application No. 20849944.2. 14 pages.
English translation of Office Action mailed Nov. 11, 2023 in CN Patent Application No. 202080069953.7. 15 pages.
Communication pursuant to Rule 164(1) EPC dated Jul. 5, 2023 in EP Patent Application No. 20849944.2. 16 pages.
English translation of Office Action mailed Feb. 8, 2024 in CN Patent Application No. 202080069953.7. 11 pages.

* cited by examiner

STRUCTURES ON MICROFLUIDIC DEVICES TO CONTROL SEDIMENTATION

BACKGROUND

The present disclosure relates generally to a microfluidic device, a system comprising the microfluidic device and an acoustic wave generator, a system comprising the microfluidic device and an electrical or magnetic device. The present disclosure relates further to another microfluidic device.

In general, a microfluidic probe is a non-contact microfluidic system combining concepts of hydrodynamic flow confinement (HFC) and scanning probes for yielding a dynamic microfluidic device that may enable the need for performing analyses within closed conduits. It operates under the well-known Hele-Shaw cell approximation, wherein a quasi-2D Stokes flow is generated between two parallel generally flat surfaces—i.e., planes—separated by an arbitrarily small gap working, for example, in a microfluidic dipole and microfluidic quadrupole configuration. Generally, the method is known for quite some time and may be used, e.g., for applications such as patterning protein arrays on flat services, mammalian cell stimulations and manipulations, localized perfusion of tissue slices as well as generating floating concentration gradients. It has always been proposed as a tissue lithography tool and may allow great prospective studies of formalin-fixed paraffin-embedded tissue sections. The technique has also been used as a tool for advanced cell chemotaxis studies, wherein it may allow studying cellular dynamics during migration in response to moving concentration gradients.

Microfluidic liquid dispensing systems can be differentiated into two categories, horizontal systems and vertical systems. In horizontal systems, fluid channels are parallel to the processed surface. In vertical systems, fluid channels are perpendicular to the processed surface.

When working with micron-sized particles (bigger than 0.1 microns, e.g. beads or cells), it can happen that gravitational forces are superior to other forces that act on them and then, unfortunately, these particles tend to sediment. In horizontal systems, the sedimentation takes place in the same region where the particle was in when the flow stopped. However, in the case of vertical systems, depending on the size of the particle and the fluid conditions, the particle will be displaced following gravity until it finds a surface where it will stop, thus contaminating the reaction surface.

The two main limitations of vertical systems that work with micron-sized particles are: sedimentation tends to occur as the main force over the particle is gravity if the flow has stopped or is under a certain flow rate; and these entities are also particularly difficult to remove from the reaction surface once their dispensing is over.

Sedimentation of particles can as well hinder sequential chemistry processes. In a sequential chemistry process, the liquids should leave no residue from the previous solution. However, if there is sedimentation of particles, a mix of the liquids can happen. In sequential chemistry, liquids in a vertical microfluidic device should maintain high purity and be exchanged within seconds.

Microfluidic probes often have to work with particles in the micron-size range, such as beads or cells. Thus, existing microfluidic probes and vertical handling systems experience limitations.

SUMMARY

According to an embodiment, a microfluidic device is provided. The microfluidic device comprises a processing surface having an aperture. The microfluidic device also comprises a liquid ejection channel which may guide to the aperture. Additionally, the microfluidic device comprises a first liquid injection channel which guides to the liquid ejection channel having a first end and a second end. Furthermore, the first liquid injection channel is arranged to provide a fluid flow from the first end to the second end. At least a portion of the first liquid injection channel is closer to the processing surface than (both) the first and second ends are to sediment particles.

According to an embodiment, a system comprising the microfluidic device according to the first embodiment discussed above and an acoustic wave generator are provided. The acoustic wave generator is arranged at the microfluidic device and configured to transmit acoustic waves through the microfluidic device.

According to an embodiment, a system comprising the microfluidic device according to the first embodiment described above and an electrical or magnetic device are provided. The electrical or magnetic device includes at least two pads arranged at the microfluidic device to enable dielectrophoresis or magnetic drag in at least a portion of the first liquid injection channel.

According to an embodiment, a microfluidic device is provided. The microfluidic device comprises a liquid channel. The liquid channel has a first end and a second end. Each of the first end and the second end end at an (respective) aperture of the microfluidic device. The liquid channel is arranged to provide a fluid flow from the first end to the second end. The first end is configured to be filled with a liquid. The second end is configured to be connected to another device and to eject the liquid into the other device. When the first end defines a top of the microfluidic device, at least a portion of the liquid channel is arranged lower than the first and second end to sediment particles therein.

BRIEF DESCRIPTION OF DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Embodiments are described, by way of example only, and with reference to the following drawings.

DETAILED DESCRIPTION

Figure 1:
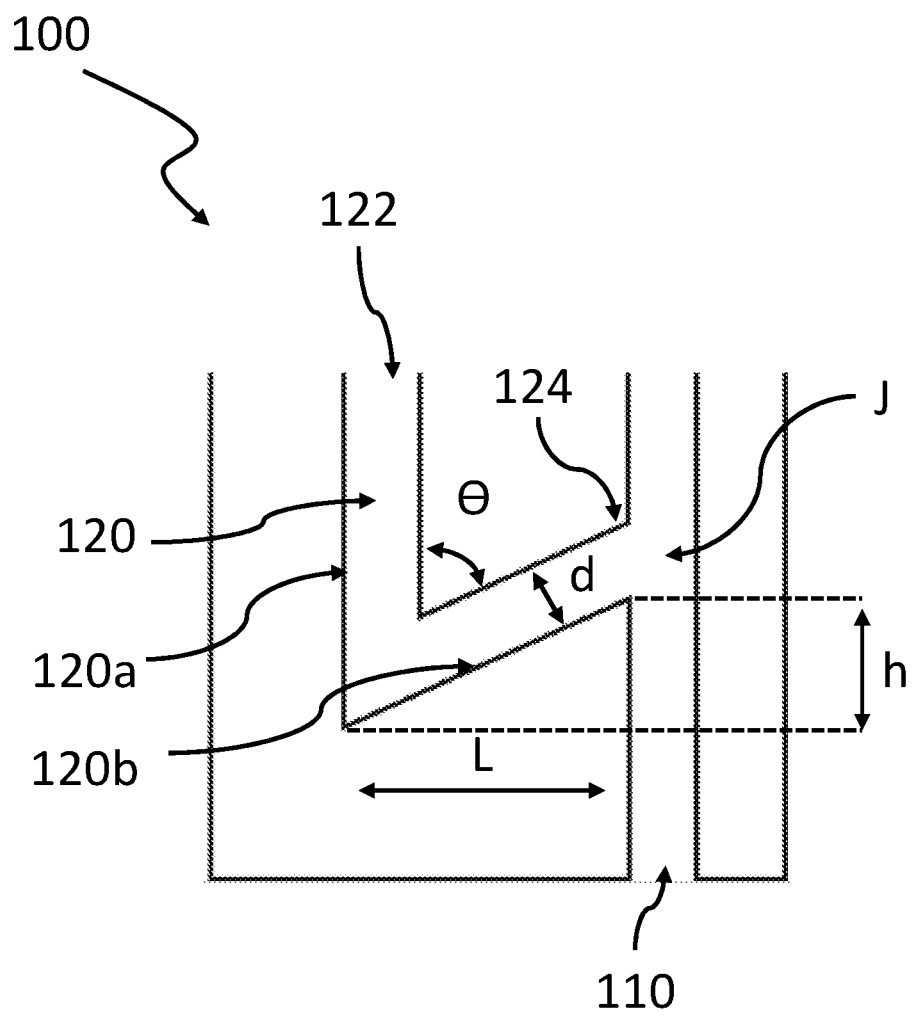
FIG. 1 shows a schematic illustration of an embodiment of a microfluidic device with one liquid injection channel.

In the context of this description, the following conventions, terms and/or expressions may be used:

The term 'microfluidic device' may denote a device which is capable of at least partly transporting fluids in conduits that are in the micron ranges.

The term 'processing surface' may denote the part of the microfluidic processing head that comes in contact with the liquids between the microfluidic probe head (MFP head) and the surface to be processed. With the MFP head, a processing liquid is confined, and the region on the surface that comes in contact with this confined processing liquid may be called the processing surface, also referred to as footprint.

The term 'aperture' may denote an opening which defines the end of the ejection channel or the entrance from the ejection channel onto the processing surface.

The term 'liquid ejection channel' may denote the channel which guides to the processing surface or which combines the channels to eject a liquid.

The term 'first liquid injection channel' may denote the channel used for injecting a liquid onto the processing surface.

The term 'first end and a second end' may denote end points of a respective channel, like inlet and outlet, or input and output.

The term 'fluid flow' may denote a flow of liquids through a defined tube having a boundary.

The term 'second liquid injection channel' may denote another liquid injection channel.

The first ends of the first and second liquid injection channels may be separately arranged at the microfluidic device.

The term 'junction' may denote a common area where the first and second liquid injection channels combine into the liquid ejection channel. The term 'junction' may also denote a junction where the first, second and third liquid injection channels combine into the liquid ejection channel.

The term 'elongation' may denote that the second liquid injection channel is the liquid ejection channel. Consequently, a liquid ejection channel may be used for injecting and ejecting liquids.

The term 'elbow' may denote the form of an elbow, such that the fluid flow is provided from the upper arm through the elbow to the forearm. The elbow may also be understood as bent elbow.

The term 'system' may denote an arrangement of different entities.

The term 'acoustic wave generator' may denote an electrical device being able to transform electric signals into acoustic waves to enable sedimenting particles of different sizes.

In particular, the particles are separated into different sizes that then can sediment, for example, in different traps.

The term 'electrical or magnetic device' may denote an alternate current, AC, generator for electrical or magnetic use together with the microfluidic device.

The term 'dielectrophoresis' may denote a phenomenon in which a force is exerted on a dielectric particle when it is subjected to a non-uniform electric field. This force does not necessarily require the particle to be charged. All particles may exhibit dielectrophoretic activity in the presence of electric fields. However, the strength of the force may depend strongly on the medium and particles' electrical properties, on the particles shape and size, as well as on the frequency of the electric field. Thus, different particles may be distinguished by leveraging this characteristic.

The term 'electrodes' may denote two contact pads provided at the microfluidic device to induce an electrical field in the respective channel(s).

The term 'magnetic coils' may denote two contact pads in the form of coils provided at the microfluidic device to induce a magnetic field in the respective channel(s).

The term 'liquid channel' may denote a channel able to transport liquids in a microfluidic regime. In particular, the liquid channel may have the same properties as the first/second/third liquid injection channels mentioned herein, as well as the liquid ejection channel.

The microfluidic device may be a microfluidic probe. The microfluidic probe may denote a mobile scanning probe for processing surfaces and objects by scanning across them. In particular, the microfluidic probe may be used for processing samples in closed micro-channels by hydro-dynamically confining liquids that performed chemistries on surfaces. In particular, the microfluidic probe may be a vertical microfluidic probe, herein.

In particular, the acoustic waves may be transmitted through at least a part of at least one of the following channels: the first liquid injection channel, the second liquid injection channel and the third liquid injection channel.

Embodiments of the microfluidic device may achieve one or more advantages and technical effects described hereafter, or may lessen one or more of the disadvantages described hereafter:

The following disadvantages of related systems may be avoided:

Residual particles may continue to flow because of sedimentation after the flow stop/switch which may affect the exposure time of localized regions of the reaction area.

The unwanted presence of residual particles may affect the reading of the final result.

Additional washing steps might be required to remove residual particles, which can affect the density of bound/reacted particles elsewhere in a reaction area.

Even if the particles no longer flow, any movement of the microfluidic device may further produce particles inside the head sediment.

The presence of particles disrupts the symmetry of flow confinements.

Microfluidic probes permit an easy implementation of sequential chemistry. If micron-sized particles are used in a vertical microfluidic device, gravity may interfere with them once the flow has stopped. Embodiments of the microfluidic device may be easily implemented in a vertical microfluidic probe in the fusion region between the injection channels.

Sedimentation chambers may help to accumulate particles to remove the possibility of clogging in the channel. Serial chambers may help trapping particles with different sedimentation coefficients. Additionally, embodiments of the microfluidic device may be implemented in monolithic devices and in planar vertical microfluidic heads. Also, the microfluidic probe may be used for separating particles of varying sizes.

In the following, additional embodiments will be described:

According to an embodiment of the microfluidic device, the microfluidic device further comprises a second liquid injection channel guiding to the liquid ejection channel. This introduces a further dimension of use for the microfluidic device. The first liquid injection channel may be an open or closed channel from the first to the second end.

According to an embodiment of the microfluidic device, the first and second liquid injection channel may merge at a junction of the liquid ejection channel, and the liquid ejection channel is arranged to provide a fluid flow from the junction to the aperture. This may enable a mixture of different particles and reaction between them inside the microfluidic device.

When in use, in certain embodiments, the first end defines an upper end, and the second end defines a lower end of the first injection channel. The at least a portion of the first liquid injection channel may define a lowest point of the first injection channel (when in use, for example with respect to gravity). This may enable sedimenting particles at the lowest point. The at least a portion of the first liquid injection channel may define a trap for particles to be sedimented.

In embodiments, a diameter of the respective channels are in a range between 50 µm and 1 mm. For example, in embodiments, the diameter of the respective channels is larger than 50 µm (or 100 µm or 150 µm or 200 µm). Furthermore, in embodiments, the diameter of the respective channels is smaller than 1 mm (or 900 µm or 800 µm or 700 µm or 600 µm or 500 µm).

According to an embodiment of the microfluidic device, a material of the microfluidic device comprises at least one of the group comprising: plastic, elastomer—in particular, polydimethylsiloxane, PDMS—metal, ceramic, glass, silicon, or a combination thereof. In embodiments, the hybrid material used is in the form of a homogenous manufactured microfluidic device. Thus, the microfluidic device may be manufactured with a variety of materials.

According to an embodiment of the microfluidic device, the liquid ejection channel is an elongation of the second liquid injection channel. Thus, different injecting measures may be enabled. Additionally, in embodiments, the second liquid injection channel forms the liquid ejection channel.

According to an embodiment of the microfluidic device, the second liquid injection channel has a first end and a second end, and is configured to provide a fluid flow from the first end of the second liquid injection channel to the second end of the second liquid injection channel, and at least a portion of the second liquid injection channel is closer to the processing surface than the first and second ends of the second liquid injection channel to sediment particles. Thus, multiple injection channels may be provided, thereby providing a variety of injecting measures.

In embodiments, the microfluidic device also has a third liquid injection channel. The third liquid injection channel has a first end and a second end and is configured to provide a fluid flow from the first end of the third liquid injection channel to the second end of the third liquid injection channel. At least a portion of the third liquid injection channel is closer to the processing surface than the first and second ends of the third liquid injection channel to sediment particles.

According to an embodiment of the microfluidic device, the first and second liquid injection channels are bent at respective angles differing from each other. Thus, different particles may be collected by different injection channels.

In embodiments, the first injection channel is bent by at least 110°. The second/third injection channel is bent by at least 100°. The second/third injection channel is bent in a range between 100° and 110° or below 110°. From a production point of view, this is not an insurmountable hurdle, and can be realized with standard effort.

According to an embodiment of the microfluidic device, the first liquid injection channel is in the form of an angled elbow. In embodiments, the angled elbow is the curvature of the elbow. The section may be understood as curvature as well.

According to an embodiment of the microfluidic device, the at least a portion of the first liquid injection channel is a section of a curve, with its bulge being closest to the processing surface. Thus, sedimentation of particles may be increased. In certain embodiments, the curve has a slope defining a trough. However, the bulge may also be bent upwards, such that the bend does not define the closest point with respect to the processing surface. This may have the same effect of increased sedimentation. For example, in an embodiment, the first and second ends of the curve are closer to the processing surface than the bend. Further, the first end of the curve is closest to the processing surface. The first end of the curve is also be closer to the first end of the first liquid injection channel than to the second end of the first liquid injection channel.

According to an embodiment of the microfluidic device, the at least a portion of the first liquid injection channel may comprise one or more sedimentation chambers. Thus, different particles—in particular those of different size—may be collected in one single injection channel. Each of the additional sedimentation chambers may have a different sedimentation coefficient.

According to an embodiment of the microfluidic device, the at least a portion of the first liquid injection channel is bent such that a direction of the fluid flow direction is changed by over 90°. Alternatively, the direction of the fluid flow direction is changed by over 100° (or 105° or 110° or 115° or 120°).

According to an embodiment of the microfluidic device, the at least a portion of the first liquid injection channel is a helix shaped portion. Helix form may be a simpler sedimentation structure in view of manufacturing.

According to an embodiment of the microfluidic device, the microfluidic device further comprises an expulsion channel, wherein one end of the expulsion channel is arranged at the liquid injection channel to transport sedimented particles when turning the microfluidic device around against gravity. Thus, an easy usage for removing sedimented particles may be provided.

Moreover, in certain embodiments, the expulsion channel is straight and may be arranged such that when turning the microfluidic device upside down in an opposite direction of gravity, the sedimented particles may be transported outwards of the microfluidic channel along the expulsion channel.

According to an embodiment of the microfluidic device, the one end of the expulsion channel is arranged between the first and second ends. This may enable a better removal of sedimented particles.

In certain embodiments, one end of the expulsion channel is arranged between the first end and the second end at the at least a portion of the first liquid injection channel. The expulsion channel may be a closed channel from a first end of the expulsion channel to a second end of the expulsion channel.

According to an embodiment of the system, the at least two pads are first and second electrodes for providing an electric field through at least a portion of the first, second and/or third liquid injection channel or are first and second magnetic coils for providing a magnetic field through at least a portion of the first, second and/or third liquid injection channel. This may enable a better control over the separation and sedimentation process of the particles.

In certain embodiments, at least two pads are arranged in or on the microfluidic device; for example at opposite sides of a sheath of the microfluidic device to enable dielectrophoresis in at least a portion of at least one of the following channels: the first liquid injection channel, the second liquid injection channel and the third liquid injection channel.

In certain embodiments, dielectrophoresis or magnetic drag is caused by applying electric AC current, at the at least two pads, by the electrical or magnetic device.

According to an embodiment of the microfluidic device, the first liquid injection channel has multiple elbow-shaped sections between the first and second ends of the liquid channel. This may enable separating particles of different sizes along the liquid channel at different bends.

Additionally, because of the special design and shape of the channels of the device, the sedimented particles may be removed by just turning the microfluidic device, for example by turning it upside down.

The elbow-shaped sections may be straight or comprise a slope. The liquid channel may be in the form of a zigzag. The zigzag may provide for sedimenting different levels. The levels may be defined by the zigzag form where particles can sediment. The levels may be in the form of troughs. For example, at least two levels may be provided. When in use, the two levels may be defined by different height inside the microfluidic device.

According to an embodiment of the microfluidic device, the multiple elbow-shaped sections each have different angles according to different sedimentation coefficients of particles. This may enable sedimenting particles with different sedimentation coefficients along the liquid channel at different bends, respectively. The liquid channel may be in the form of a zigzag having different corner bends.

In the following, a detailed description of the figures will be given. All instructions in the figures are schematic. Firstly, a schematic illustration of an embodiment of the microfluidic device is given. Afterwards, further embodiments, as well as embodiments of the systems and the other microfluidic device, will be described.

FIG. 1 shows a schematic illustration of an embodiment of the microfluidic device 100 with one liquid injection channel 120. The liquid injection channel 120 may have a first end 122 and a second end 124. The first end 122 is used to fill in a liquid. The second end 124 is used to connect to an ejection channel 110. The connecting point may be defined by a junction J. The connection between the injection channel 120 and the (for example straight) ejection channel 110 at the junction J may be slightly angled. The ejection channel 110 guides to an aperture (not shown); for example, in case of a microfluidic probe. The liquid injection channel 120 is arranged such that particles can be sedimented in at least a portion of the liquid injection channel 120 under the influence of gravity. This may be in the form of a bend described by an angle $\ominus$. The liquid injection channel 120 may be described by two arms joining together to an elbow, wherein one arm 120a is arranged vertical and the other arm 120b is arranged with the angle $\ominus$ with respect to a horizontal.

Exemplary channel dimensions in dependence of particle size may be (x=particle size and d=100 μm):
  For particles 0.1<x<0.3 μm: 25°<θ<10°, L>100 μm.
  For particles 0.3<x<1 μm: 45°<θ<25°, L>500 μm.
  For particles x>1 μm: 85°<θ<45°, L>1000 μm.

This may vary depending on the material of the specific particle.

A structure with the angle θ may allow the sedimentation of micron-sized particles. Particles may sediment in the structure instead of travelling to the reaction area (which is at an end of the ejection channel 110).

The following conditions may be applied:
  Use of particles over 0.1 μm, as smaller particles will not sediment based on gravity alone.
  It must have laminar flow (have Reynolds number<1, microscale channels).
  The system should not contain air.
  Sedimentation in the channels can be overcome by regulating the flow rate.

The bent liquid injection channel may be easily implemented through a variety of processes; for example: micromachining, lithography or 3D printing.

The size of the channel that accumulates sedimented particles can be tuned depending on necessities. Particles do not accumulate during flow dispense. Sedimentation will start occurring only if particles flow under a predefined limited velocity.

Lateral movement of the microfluidic device 100 will not cause the sedimented particles to be removed from it. Washing can be easily achieved by injection of high flow rates or inverting the device.

The at least one portion of the liquid injection channel 120 may be adapted to a specific sedimentation coefficient of a particle to trap in the liquid injection channel. Knowing the sedimentation coefficient can help in the design of the microfluidic device 100, since it shows for which particles it is possible to separate and which are the channel dimensions that each of the particles require. The following formula shows the dependencies of the various variables:

$$s = \frac{m}{6\pi\eta r_0}$$

wherein
η: viscosity of the medium,
m: mass, and
$r_0$: radius of the particle.

The sedimentation speed is equivalent to the terminal velocity. The sedimentation coefficient is expressed in svedbergs (s). It depends on the properties of the particle and the medium in which it is embedded. Usually it is described in water at 20° C.

More details and aspects are mentioned in connection with the embodiments described above or below. The embodiment shown in FIG. 1 may comprise one or more optional additional features corresponding to one or more aspects mentioned in connection with the proposed concept or one or more embodiments, described below (e.g. FIGS. 2-13).

Figure 2:
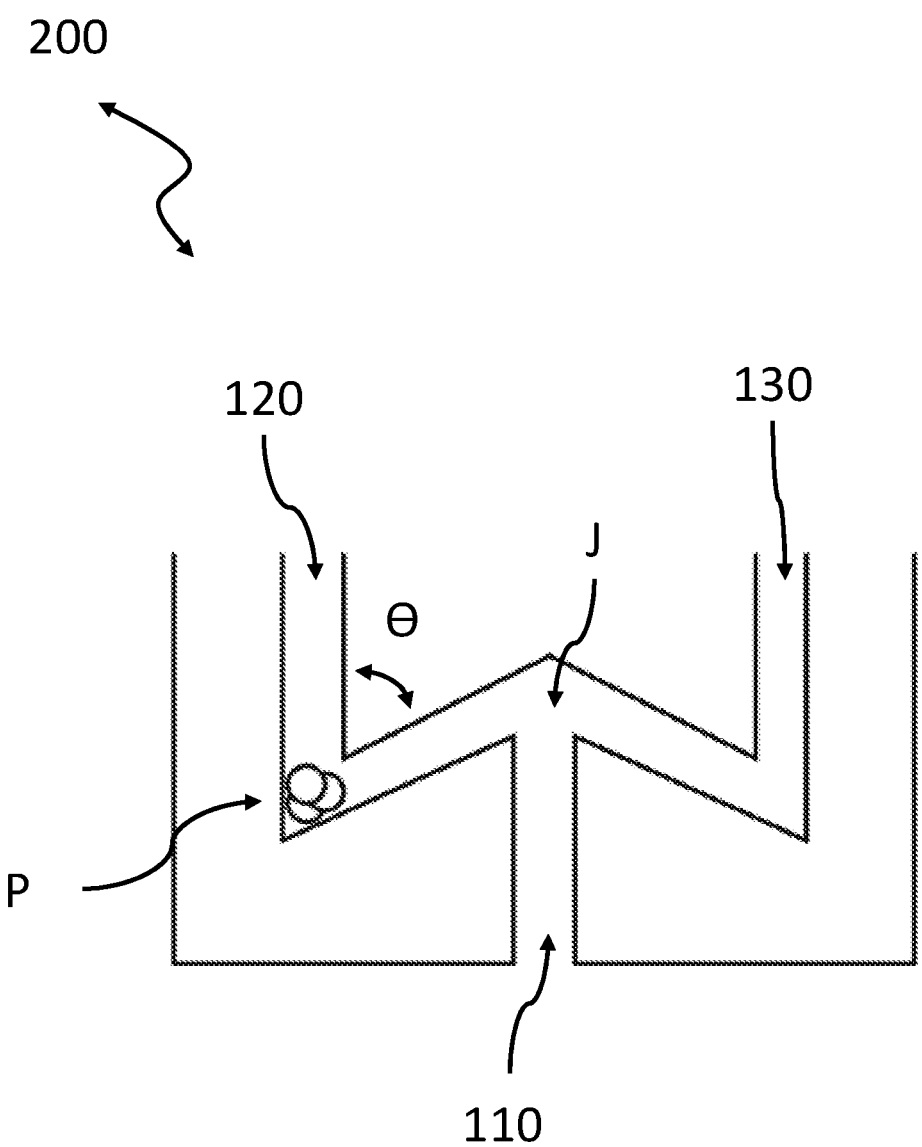
FIG. 2 shows a schematic illustration of an embodiment of a microfluidic device with two liquid injection channels.

FIG. 2 shows a schematic illustration of an embodiment of the microfluidic device 200 with two liquid injection channels, 120 and 130. The two liquid injection channels 120 and 130 may have the same bent form as with respect to FIG. 1. The two liquid injection channels 120 and 130 may be arranged parallel or symmetrically with respect to the junction J at which the two liquid injection channels 120 and 130 merge into the liquid ejection channel 110 of the microfluidic device 200. The particles P may then be trapped in both the liquid injection channels 120 and 130—in particular in the respective elbows. Due to the symmetry, the same kind of particle with a same sedimentation coefficient may be trapped in the respective trough of the liquid injection channels 120 and 130.

A variety of materials may be used for the microfluidic device 200 and all the other microfluidic devices described with respect to the figures herein. For example, the following materials may be used:

Plastics: easy fabrication settings or disposable devices. Biocompatible plastics can be used in the case of working with micron-sized particles such as cells.

Metals: material that is easy to machine and ideal for applications that require of longer durability. Metals tend not to react with most common micron-sized particles (beads or cells) and are easy to clean.

Ceramics: withdraw high temperatures or high changes in pressure.

Complex geometries can be explored through the use of 3D printing technologies.

Figure 3:
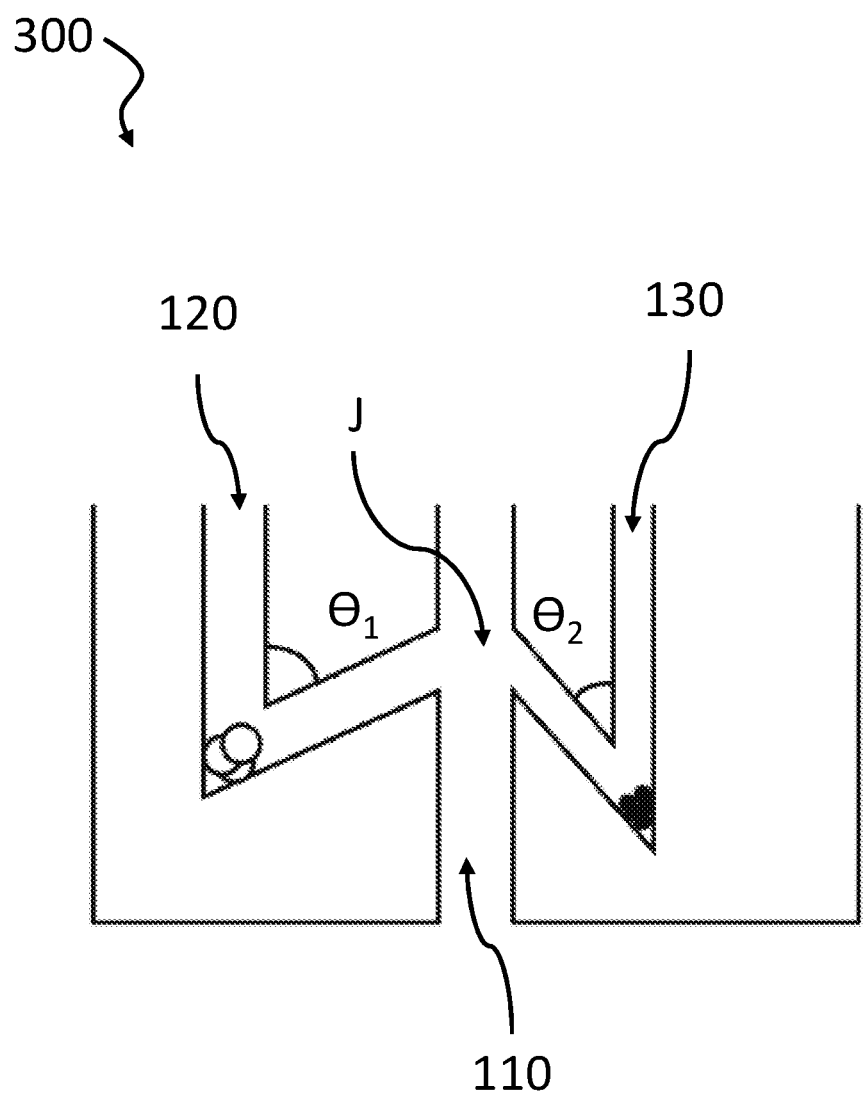
FIG. 3 shows a schematic illustration of an embodiment of a microfluidic device with two liquid injection channels having different angles.

FIG. 3 shows a schematic illustration of an embodiment of the microfluidic device 300 with two liquid injection channels 120 and 130 having different angles $\Theta_1$ and $\Theta_2$.

Two angles with two different θ can be incorporated into a single microfluidic device 300. The injection channel 120 may guide into the ejection channel 110 at the junction J at a smaller angle $\Theta 1$ (or 180°−$\Theta 1$) in comparison to the injection channel 130. The injection channel 130 may lead into the ejection channel 110 at the junction J at a higher angle $\Theta_2$ (or 180°−$\Theta_2$).

In some cases, it might be necessary to use sequential chemistry with several types of micron-sized particles. For particles smaller than 0.3 micron, the effects of Brownian motion are much higher, which can cause the particles to overcome a too low barrier. Brownian motion has an effect in particles up to 1 µm. As shown in FIG. 3, the microfluidic device 300 is adapted to different sedimentation coefficients of micron-sized particles. This will retain the required particles until the experiment is finished.

Figure 4:
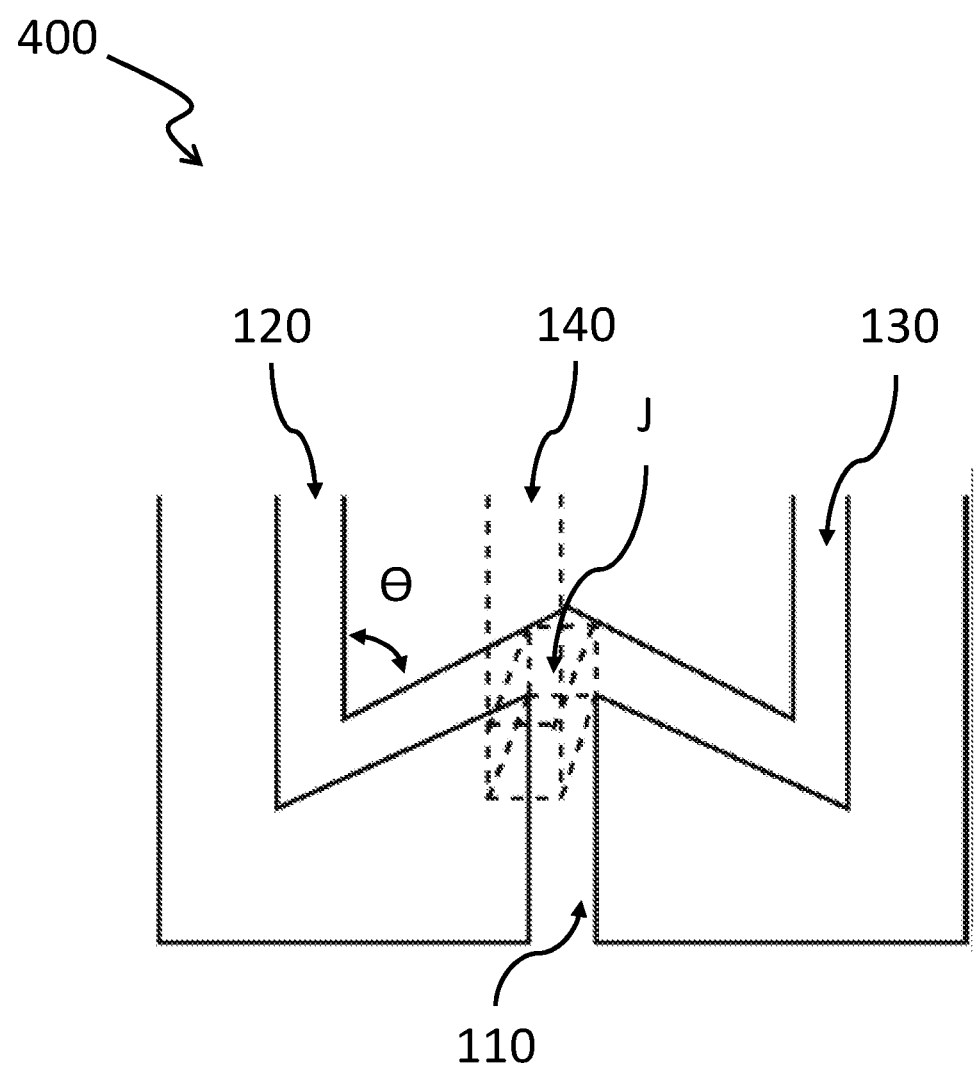
FIG. 4 shows a schematic illustration of an embodiment of a microfluidic device with three liquid injection channels.

FIG. 4 shows a schematic illustration of an embodiment of the microfluidic device 400 with three liquid injection channels 120, 130 and 140. The arrangement of the three liquid injection channels 120, 130 and 140 may be symmetric with respect to the junction J. However, it may be adapted, as described with respect to FIG. 3, such that the three liquid injection channels 120, 130 and 140 are all adapted for a different sedimentation coefficient. Thus, the three liquid injection channels 120, 130 and 140 may all have a different angle θ. There may also be a higher number of liquid injection channels depending on the number of inlets, described as first ends of the respective liquid injection channel herein.

Figure 5:
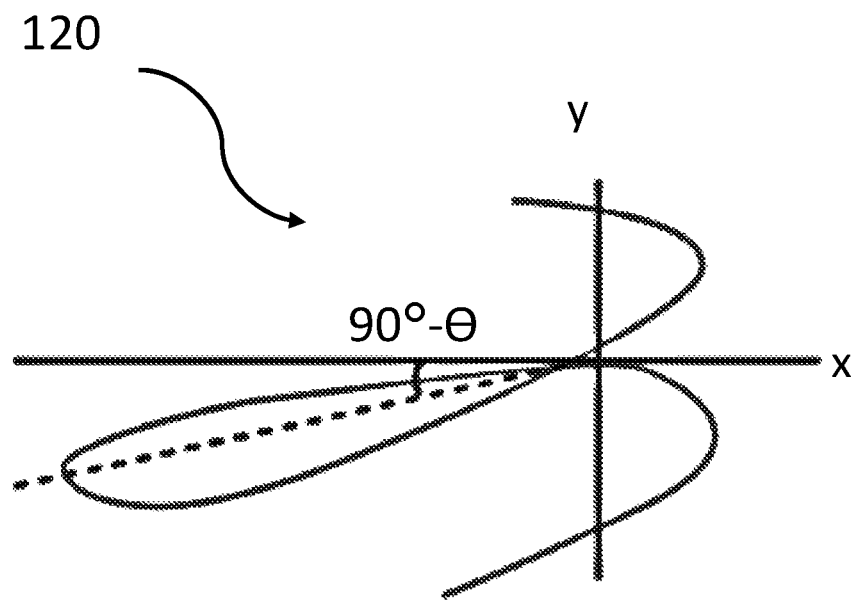
FIG. 5 shows a schematic illustration of a liquid injection channel in the form of a helix, according to an embodiment.

FIG. 5 shows a schematic illustration of a liquid injection channel 120 in the form of a helix.

Constructing the respective channels of the microfluidic device, as described herein, in helix shape can also limit the amount of particles that can access the reaction area. The helix may be formed with different slopes or slope heights in order to sediment different particle sizes. This is particularly illustrated by an exemplary angle 90°−θ in FIG. 5.

The particles can accumulate in the turns that are at a lower θ than the rest of the helix. This may be an alternative to a single injection channel, and it can incorporate turns with several angles. The width of a channel can also expand to accommodate a higher amount of particles.

Figure 6:
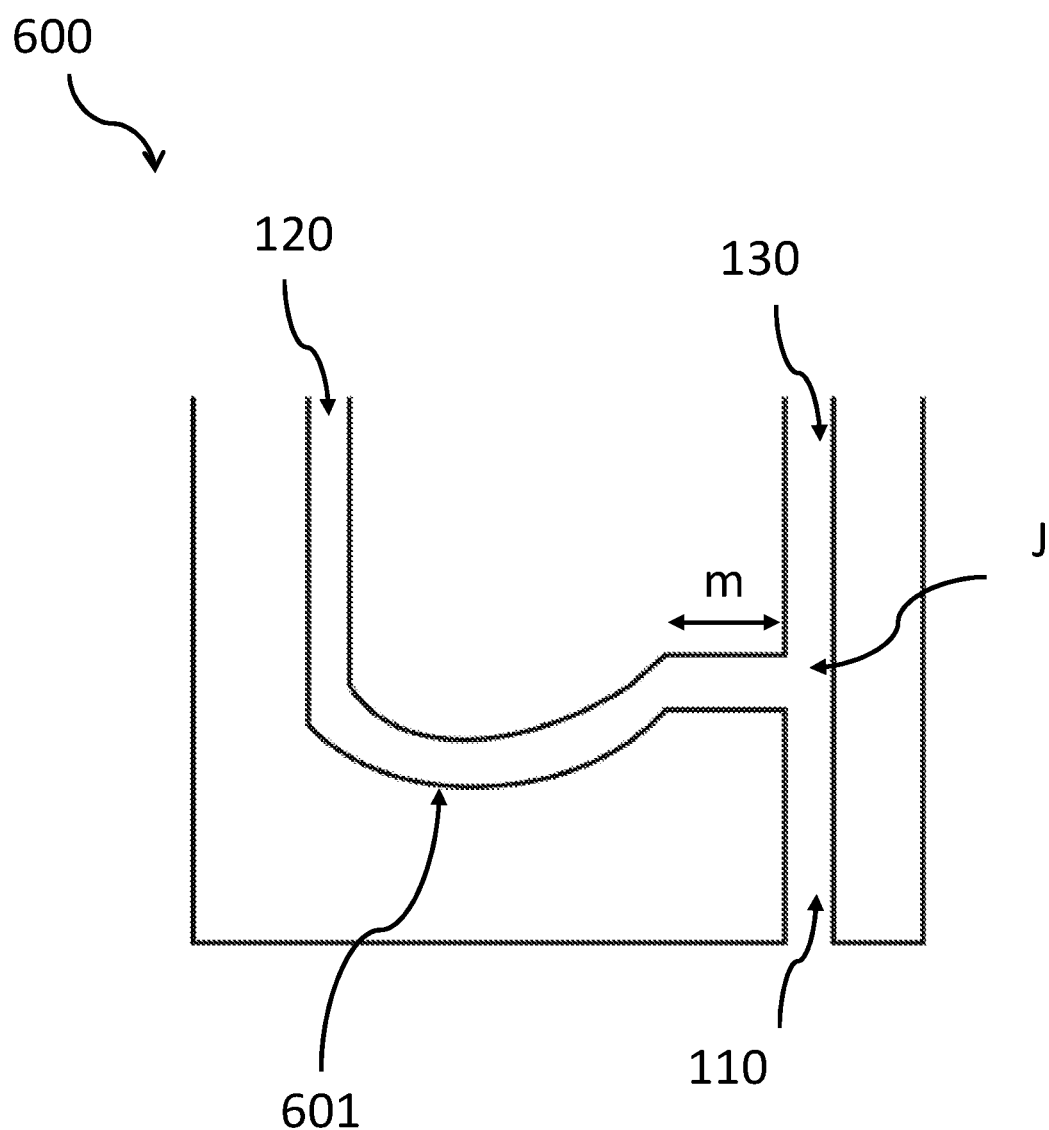
FIG. 6 shows a schematic illustration of an embodiment of a microfluidic device with a liquid injection channel having a curvature.

FIG. 6 shows a schematic illustration of an embodiment of the microfluidic device 600 with a liquid injection channel 120 having a curvature 601. Another liquid injection channel 130 may be an elongation of the ejection channel 110, as shown in FIG. 6. The ejection channel 110 may be straight from top to bottom of the microfluidic device 600 (or may have another form). The bend 601 in the liquid injection channel 120 may be in the form of a curve such that the curve defines a lowest area of the liquid injection channel 120. The bend 601 may end in a distance m from the ejection channel 130 such that the liquid injection channel 120 may end straight (without an angle) at the liquid ejection channel 110.

Figure 7:
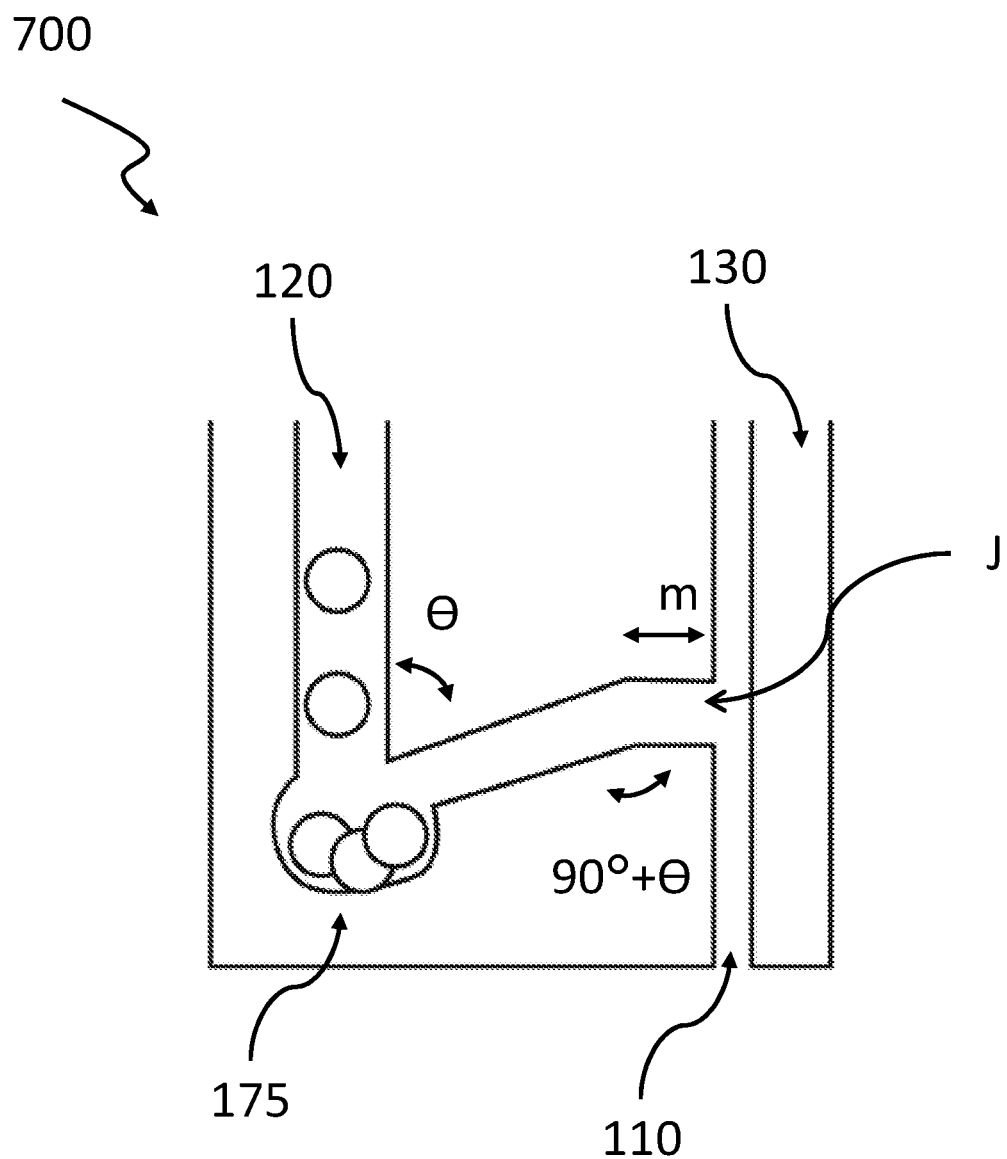
FIG. 7 shows a schematic illustration of an embodiment of a microfluidic device with a liquid injection channel having a trough.

FIG. 7 shows a schematic illustration of an embodiment of the microfluidic device 700 with a liquid injection channel 120 having a trough 175. The trough 175 may be arranged at a lowest end of the liquid injection channel 120 such that from the first end of the liquid injection channel 120, the trough is arranged in vertical direction downwards from the first end. The second end is arranged slightly upwards from the trough in an angular direction to a horizontal direction from the trough. The liquid injection channel 120 may be led into the liquid ejection channel 110 by a straight portion of the liquid injection channel 120 having a length m (m can also be 0), such that the liquid injection channel 120 enters the liquid ejection channel 110 at the junction J perpendicularly.

Figure 8:
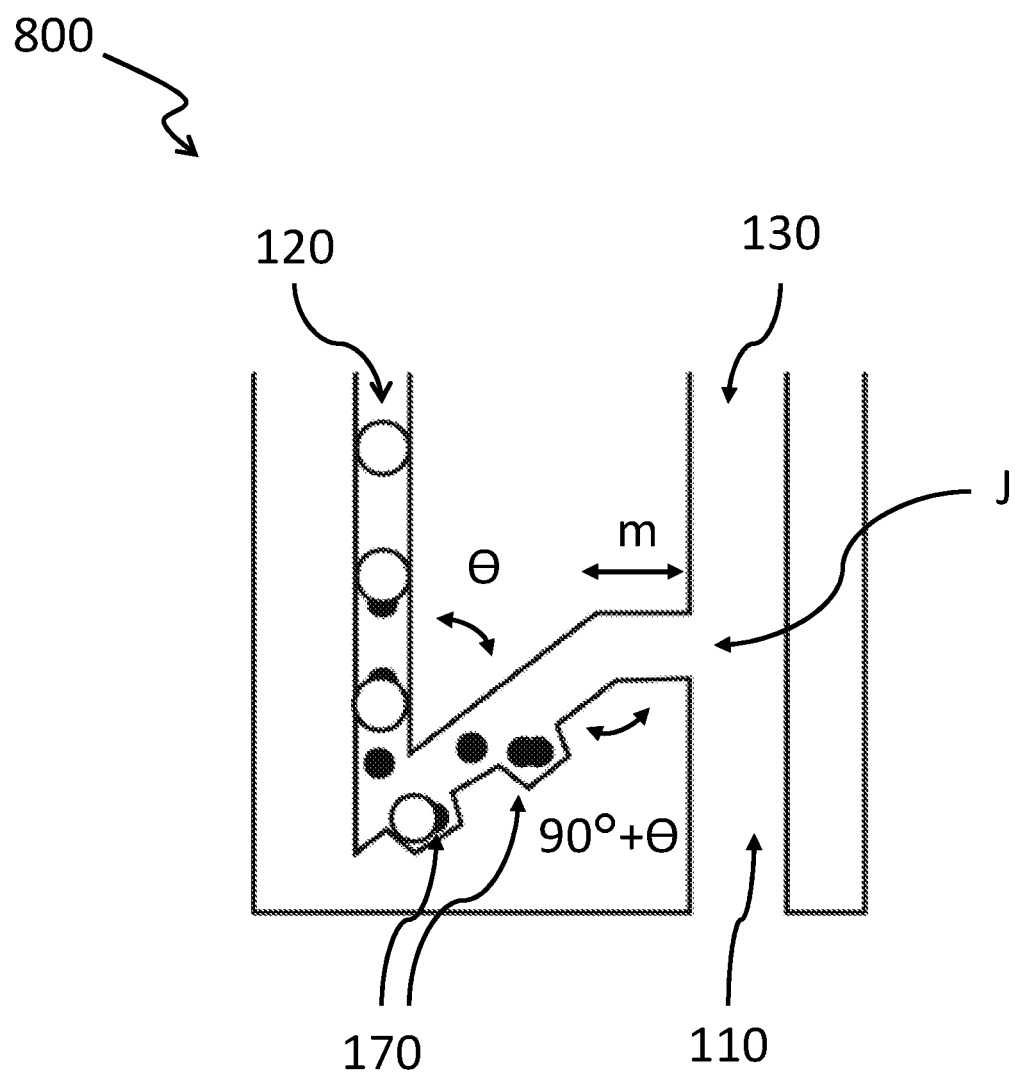
FIG. 8 shows a schematic illustration of an embodiment of a microfluidic device with a liquid injection channel having two sedimentation chambers.

FIG. 8 shows a schematic illustration of an embodiment of the microfluidic device 800 with a liquid injection channel 120 having two sedimentation chambers 170. Multiple sedimentation chambers 170 (more than two chambers) may also be arranged in the liquid injection channel 120. The sedimentation chambers 170 may be arranged in an outwardly aligned part of the liquid injection channel 120 to sediment differently sized particles. The sedimentation chambers 170 may be arranged at different heights in the liquid injection channel 120.

Figure 9:
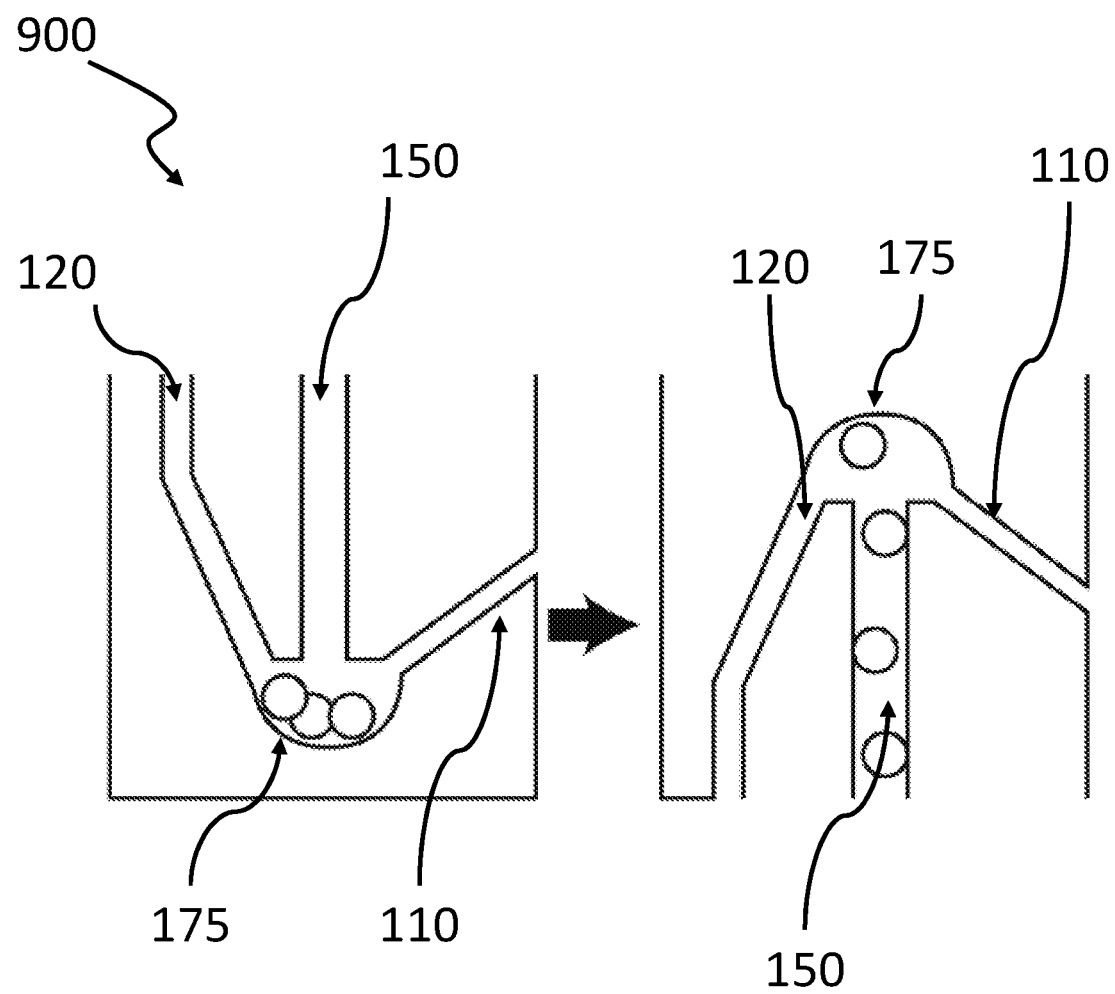
FIG. 9 shows a schematic illustration of an embodiment of a microfluidic device with an expulsion channel.

FIG. 9 shows a schematic illustration of an embodiment of the microfluidic device 900 with an expulsion channel 150 and a trough 175. The expulsion channel 150 may be arranged with one end at the steepest part of the liquid injection channel 120 (this may be the trough 175 in FIG. 7) and with the other end at an aperture of the microfluidic device 900 to enable transport of sedimented particles. This is achieved by turning the vertical microfluidic device 900 upside down. Then, the particles sedimented in the trough 175 may be guided through the expulsion channel 150 for removal of the sedimented particles.

Specifically, each of the described microfluidic devices herein may be vertical microfluidic devices. These microfluidic devices may be defined and described by direction terms like up and down respectively. Consequently, the vertical microfluidic devices may be defined by directional language herein.

After the particles have been separated, they can be recovered. This may be performed by the expulsion channel 150 through which the particles can exit the microfluidic device 900.

The expulsion can happen through several methods:
an inversion of the microfluidic device 900, to use the sedimentation of the particles themselves to remove them, an application of a force in the sedimentation chamber, for instance through the incorporation of an additional expulsion channel 150 in the chamber, and an application of a vacuum at the expulsion channel 150.

It is possible to have several expulsion channels 150 to have separation of all the particles that have been trapped due to their differential sedimentation coefficient.

Figure 10:
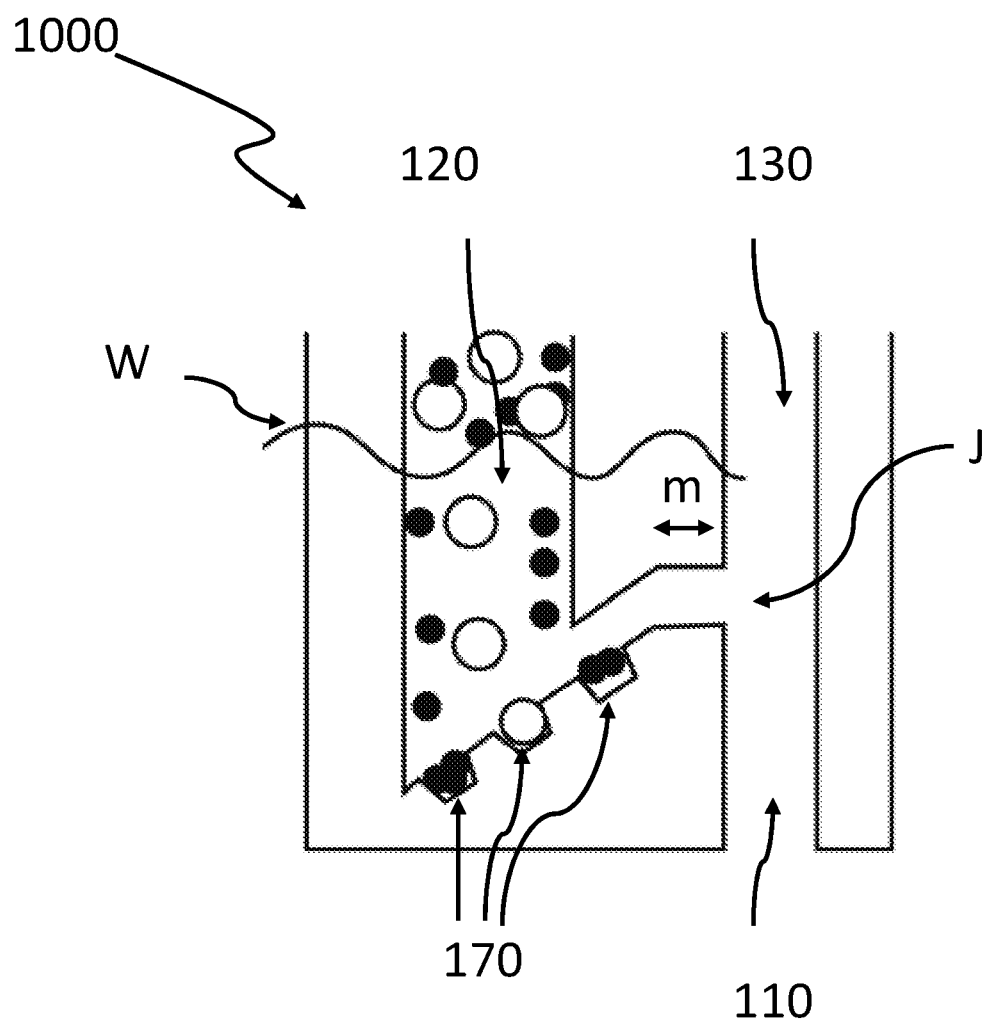
FIG. 10 shows a schematic illustration of a system with a microfluidic device under influence of an acoustic wave, according to an embodiment.

FIG. 10 shows a schematic illustration of a system 1000 with a microfluidic device under influence of an acoustic wave W. The microfluidic device may have first and second liquid injection channels 120 and 130 as well as an ejection channel 110. The first liquid injection channel 120 may have separate sedimentation chambers 170 arranged at different positions in the first liquid injection channel 120 to sediment a particle mix injected in the first liquid injection channel 120 due to different sedimentation coefficients. In FIG. 10, there are three sedimentation chambers 170 arranged behind each other along the first liquid injection channel 120. Each of the sedimentation chambers 170 are displaced by a gap such that the particles may easily sediment according to their respective sedimentation coefficient. The acoustic wave W helps to separate the particles into these sedimentation chambers 170.

Figure 11:
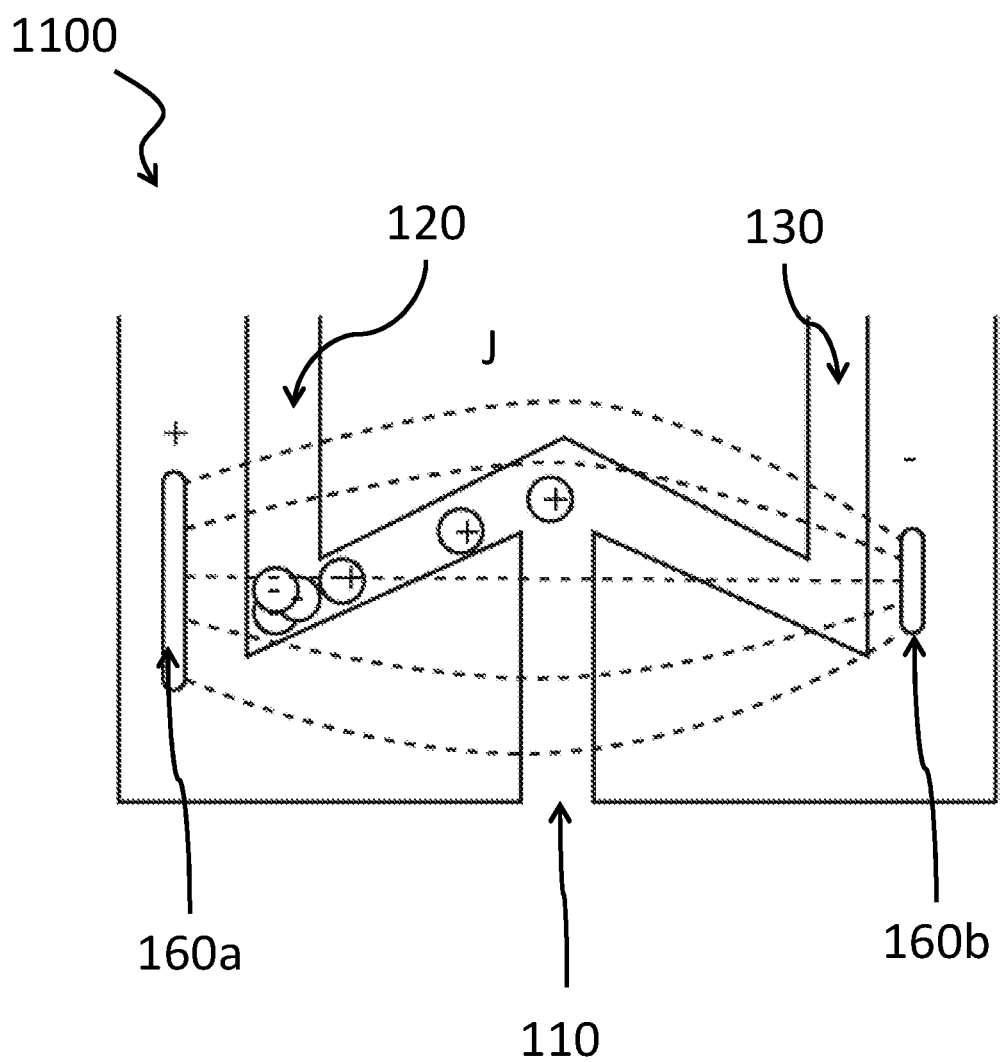
FIG. 11 shows a schematic illustration of a system with a microfluidic device and electrical or magnetic contact pads, according to an embodiment.

FIG. 11 shows a schematic illustration of a system 1100 with a microfluidic device and electrical or magnetic contact pads 160a and 160b. The contact pad 160a is illustrated as a positive electrode, such as an anode, and the contact pad 160b is illustrated as a negative electrode, such as a cathode, in FIG. 11.

The microfluidic device can be combined together with an electrical or magnetic device for generating AC in order to improve its efficiency. This way, the geometry of the device will be enhanced with the capabilities of other techniques, which give a higher specificity in selection. Examples are as follow:

The use of acoustic waves W (see FIG. 10) to have a concise selection of the size of the particles to sediment.

Use of dieletrophoresis (DEP) (see FIG. 11) to achieve a selective separation of particles with an electric field to further trap them according to their polarizability or size; these particles can be immediately used for an experiment.

Figure 12:
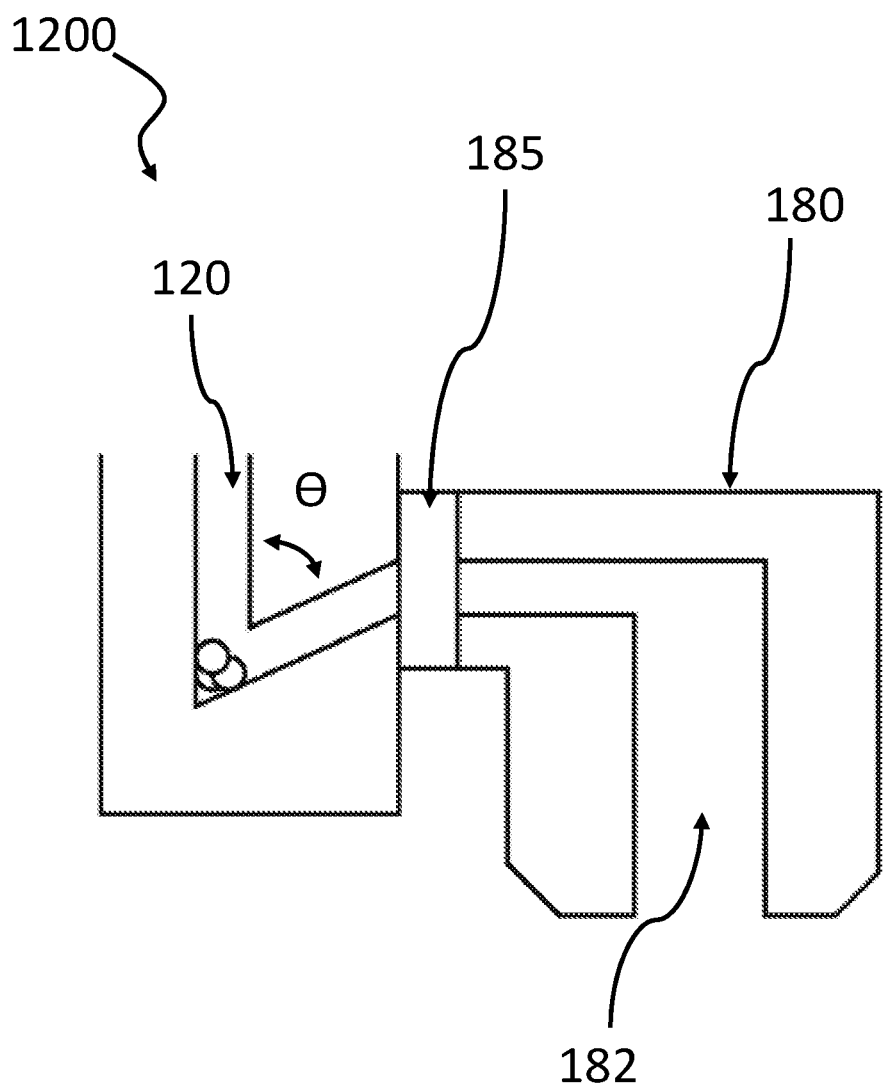
FIG. 12 shows a schematic illustration of an embodiment of a microfluidic device with another device.

FIG. 12 shows a schematic illustration of an embodiment of the microfluidic device 1200 with another device 180.

The microfluidic device 1200 can be implemented to be used with the other device 1202. By allocating the microfluidic device 1200, it is possible to avoid sedimentation at the connected device 1202 and have a removable unit (the microfluidic device 1200) that can be exchanged or cleaned as necessary.

The other device 1202 may have a pump 1204 (or a vent). The pump 1204 may provide a force on the liquid from the second end of the liquid channel 120. Thus, the liquid can be transferred to the other device 1202. The other device 1202 may be connectable to the microfluidic device 1200. In particular, the second end of the liquid channel 120 may be adapted or matched to an end of a liquid channel 1206 of the other device 1202 in order to transfer liquid to the other device 1202. Any connection technique may be possible.

Figure 13:
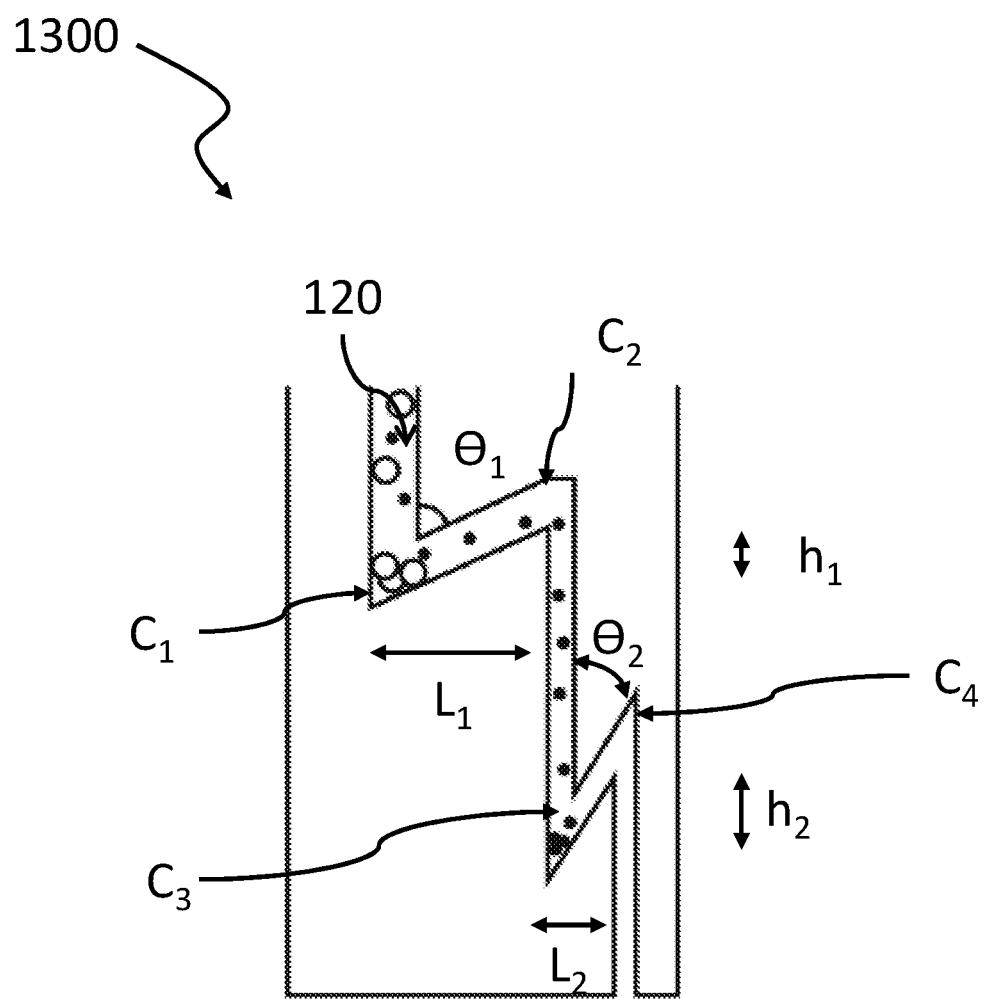
FIG. 13 shows a schematic illustration of an embodiment of a microfluidic device with a liquid channel in the form of a zigzag.

FIG. 13 shows a schematic illustration of an embodiment of the microfluidic device 1300 with a liquid injection channel 120 in the form of a zigzag. Separation of differently sized particles can be achieved by putting series of bends with different angles θ after one another, for example subsequently.

Bigger particles may have to be separated first, since they require a larger angle θ. Smaller particles can overcome a lower angle θ, so their separation may happen after separation of larger particles; for example subsequently.

In view of the liquid which is injected into the liquid injection channel 120 of the microfluidic device 1300, the injected liquid is guided around a first corner C1 with a direction change of over 90° (namely 180°−$\theta_1$) in a first turning direction. Then the injected liquid is guided along a section of the liquid injection channel 120 from the first corner C1 to a second corner C2. The injected liquid is guided around the second corner C2 with a direction change of over 900 (namely 180°−$\theta_1$) in a second turning direction different from the first turning direction.

Then, the injected liquid is guided up to a third corner C3. The injected liquid is guided around the third corner C3 with a direction change of over 90° (namely 180°−$\theta_2$) in the first turning direction. $\theta_2$ is larger than $\theta_1$. Then the injected liquid is guided along a section of the liquid injection channel 120 from the third corner C3 to a fourth corner C4. The injected liquid is guided around the fourth corner C4 with a direction change of over 90° (namely 180°−$\theta_2$) in the second turning direction.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A microfluidic probe for processing surfaces and objects by scanning across said surfaces and objects, the microfluidic probe comprising:

a processing surface having an aperture, the processing surface configured to contact processing liquid;

a liquid ejection channel guiding to the aperture;

a first liquid injection channel guiding to the liquid ejection channel, wherein the first liquid injection channel has a first end and a second end, wherein the first liquid injection channel is arranged to provide a fluid flow from the first end to the second end, and wherein the first liquid injection channel comprises an angled elbow for sedimenting particles within the fluid flow;

wherein at least a portion of the first liquid injection channel is closer to the processing surface than the first and second ends are, such that the portion of the first liquid injection channel is configured to sediment particles within the fluid flow at the angled elbow; and wherein the microfluidic probe is configured for processing samples in closed micro-channels by hydro-dynamically confining the processing liquid.

2. The microfluidic probe according to claim 1, wherein a material of the microfluidic probe comprises at least one of: a plastic, an elastomer, a metal, a ceramic, glass, silicon, or a combination thereof.

3. The microfluidic probe according to claim 1, wherein the at least a portion of the first liquid injection channel is a section of a curve, with its bulge closest to the processing surface.

4. The microfluidic probe according to claim 1, wherein the at least a portion of the first liquid injection channel comprises one or more sedimentation chambers.

5. The microfluidic probe according to claim 1, wherein the at least a portion of the first liquid injection channel is bent such that a direction of the fluid flow direction is changed by over 90°.

6. The microfluidic probe according to claim 1, wherein the at least a portion of the first liquid injection channel is a helix shaped portion.

7. The microfluidic probe according to claim 1, the first liquid injection channel comprises a first arm and a second arm joined together to form the angled elbow, wherein the first liquid injection channel is configured such that an entire fluid flow enters from the first end of the first liquid injection channel into the first arm towards the angled elbow, is redirected to the second arm, and exits the second end of the first liquid injection channel, while sedimenting particles at the angled elbow between the first end and the second end.

8. The microfluidic probe according to claim 1, further comprising an expulsion channel, wherein one end of the expulsion channel is arranged at the liquid injection channel to transport sedimented particles when turning the microfluidic probe around against gravity.

9. The microfluidic probe according to claim 8, wherein the one end of the expulsion channel is arranged between the first and second ends.

10. The microfluidic probe according to claim 1, further comprising a second liquid injection channel guiding to the liquid ejection channel.

11. The microfluidic probe according to claim 10, wherein the first and second liquid injection channels merge at a junction of the liquid ejection channel, and wherein the liquid ejection channel is arranged to provide a fluid flow from the junction to the aperture.

12. The microfluidic probe according to claim 10, wherein the liquid ejection channel is an elongation of the second liquid injection channel.

13. The microfluidic probe according to claim 10, wherein the second liquid injection channel has a first end and a second end and is arranged to provide a fluid flow from the first end of the second liquid injection channel to the second end of the second liquid injection channel, and at least a portion of the second liquid injection channel is closer to the processing surface than the first and second ends of the second liquid injection channel are such that the portion of the second liquid injection channel is configured to sediment particles within the fluid flow.

14. The microfluidic probe according to claim 10, wherein the first and second liquid injection channels are bent at respective angles differing from each other.

15. A system comprising:
a microfluidic device including
a processing surface having an aperture,
a liquid ejection channel guiding to the aperture, and
a first liquid injection channel guiding to the liquid ejection channel, wherein the first liquid injection channel has a first end and a second end, wherein the first liquid injection channel is arranged to provide a fluid flow from the first end to the second end, and wherein the first liquid injection channel comprises an angled elbow for sedimenting particles within the fluid flow; and
an acoustic wave generator arranged at the microfluidic device and configured to transmit acoustic waves through the microfluidic device, wherein the acoustic waves are configured to sediment particles,
wherein at least a portion of the first liquid injection channel is closer to the processing surface than the first and second ends are, such that the portion of the first liquid injection channel is configured to sediment particles within the fluid flow at the angled elbow.

16. A system comprising:
a microfluidic device including
a processing surface having an aperture,
a liquid ejection channel guiding to the aperture, and
a first liquid injection channel guiding to the liquid ejection channel, wherein the first liquid injection channel has a first end and a second end, wherein the first liquid injection channel is arranged to provide a fluid flow from the first end to the second end, and wherein the first liquid injection channel comprises an angled elbow for sedimenting particles within the fluid flow; and
an electrical or magnetic device having at least two pads arranged at the microfluidic device to enable dielectrophoresis or magnetic drag in at least a portion of the first liquid injection channel, wherein the dielectrophoresis or magnetic drag is configured to sediment particles,
wherein the angled elbow of the first liquid injection channel is closer to the processing surface than the first and second ends are, such that the portion of the first liquid injection channel is configured to sediment particles within the fluid flow at the angled elbow.

17. The system according to claim 16, wherein the at least two pads are first and second electrodes for providing an electric field through at least the portion of the first liquid injection channel or first and second magnetic coils for providing a magnetic field through at least portion of the first liquid injection channel.

* * * * *